(12) United States Patent
Kang et al.

(10) Patent No.: US 12,629,309 B2
(45) Date of Patent: May 19, 2026

(54) EXOSKELETON WEARABLE ROBOT

(71) Applicants: HYUNDAI MOTOR COMPANY, Seoul (KR); KIA CORPORATION, Seoul (KR); SEOUL NATIONAL UNIVERSITY R&DB FOUNDATION, Seoul (KR)

(72) Inventors: Seok Won Kang, Seoul (KR); Jung Ho Kim, Seoul (KR); Yoon Young Kim, Seoul (KR); Joo Young Chun, Seoul (KR); Dong Jin Hyun, Suwon-si (KR)

(73) Assignees: HYUNDAI MOTOR COMPANY, Seoul (KR); KIA CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 733 days.

(21) Appl. No.: 17/406,280

(22) Filed: Aug. 19, 2021

(65) Prior Publication Data

US 2022/0133579 A1 May 5, 2022

(30) Foreign Application Priority Data

Nov. 4, 2020 (KR) ........................ 10-2020-0146019

(51) Int. Cl.
*A61H 3/00* (2006.01)
*B25J 9/00* (2006.01)
(Continued)

(52) U.S. Cl.
CPC .............. *A61H 3/00* (2013.01); *B25J 9/0006* (2013.01); *B25J 9/1065* (2013.01); *B25J 13/088* (2013.01); *A61H 2003/007* (2013.01); *A61H 2201/163* (2013.01); *A61H 2201/165* (2013.01); *A61H 2201/1659* (2013.01)

(58) Field of Classification Search
CPC ................ A61H 3/00; A61H 2003/007; A61H 2201/165; A61H 2201/1659; B25J 9/0006; B25J 9/1065; B25J 13/088
See application file for complete search history.

(56) References Cited

U.S. PATENT DOCUMENTS 9,610,208 B2 4/2017 Kazerooni et al.
2007/0225620 A1 9/2007 Carignan et al.
(Continued)

FOREIGN PATENT DOCUMENTS

KR 2014-0078480 A 6/2014
WO 2017/167349 A1 10/2017
(Continued)

*Primary Examiner* — Dinah Baria
(74) *Attorney, Agent, or Firm* — MCDONNELL BOEHNEN HULBERT & BERGHOFF LLP

(57) ABSTRACT

The present disclosure provides an exoskeleton-type wearable robot. The exoskeleton-type wearable robot includes a first fixing unit configured to be worn on the body of the wearer, a first connection unit rotatably connected to the first fixing unit, a second connection unit spaced apart from the first connection unit and connected to the first connection unit via a first link assembly, and a second fixing unit connected to the arm or the leg of the wearer and connected to the second connection unit via a second link assembly.

9 Claims, 21 Drawing Sheets

(51) Int. Cl.
| | |
|---|---|
| *B25J 9/06* | (2006.01) |
| *B25J 9/10* | (2006.01) |
| *B25J 13/08* | (2006.01) |

(56) References Cited

U.S. PATENT DOCUMENTS

| | | | |
|---|---|---|---|
| 2016/0229065 A1* | 8/2016 | Angold | .................... B25J 17/00 |
| 2016/0331624 A1 | 11/2016 | Sankai et al. | |
| 2019/0201273 A1 | 7/2019 | Soltani-Zarrin et al. | |
| 2020/0206062 A1 | 7/2020 | Kim et al. | |

FOREIGN PATENT DOCUMENTS

| | | | | |
|---|---|---|---|---|
| WO | WO-2019076417 A1 * | 4/2019 | ............. | A61B 34/30 |
| WO | 2021/108892 A1 | 6/2021 | | |

* cited by examiner

Abduction(+)/Adduction(−) moment

Gait cycle (stance phase)

: Mean curve          : standard deviation band

Extension(+)/Flextion(−) moment

Gait cycle (stance phase)

──── : Mean curve  : standard deviation band

External(+)/Internal(−) rotation moment

Gait cycle (stance phase)

: Mean curve  : standard deviation band

Gait cycle (stance phase) (%)

Gait cycle (stance phase) (%)

EXOSKELETON WEARABLE ROBOT

CROSS REFERENCE TO RELATED APPLICATIONS

This application claims priority from Korean Patent Application No. 10-2020-0146019, filed on Nov. 4, 2020, in the Korean Intellectual Property Office, the disclosure of which is incorporated herein by reference in its entirety.

BACKGROUND

1. Field

The present disclosure relates to an exoskeleton-type wearable robot in which rotation joints for external/internal rotation are replaced by a spherical four-bar mechanism, such that the rotation center thereof coincides with the rotation center of the joint of the wearer, and in which rotation joints for flexion/extension are replaced by a four-bar mechanism, thereby supporting the flexion/extension moment and the abduction/adduction moment necessary for walking simultaneously using only one actuator, thus enabling the wearer to walk more naturally.

2. Description of the Related Art

In the conventional exoskeleton robot, a hip joint mechanism is structured such that rotation joints are connected linearly. Therefore, the rotation center of the hip joint mechanism of the robot does not coincide with the rotation center of the hip joint of the wearer, which deteriorates wearing comfort and restricts the range of motion.

In addition, in the case in which only one actuator is used, only the flexion/extension moment is supported. Therefore, it is not possible to support the abduction/adduction moment necessary for walking simultaneously with the flexion/extension moment.

In order to support the abduction/adduction moment simultaneously with the flexion/extension moment, an additional actuator is required, which increases the weight of the robot, deteriorates reactivity, and imposes a heavy burden on the wearer.

The information disclosed in this Background section is only for enhancement of understanding of the general background of the disclosure and should not be taken as an acknowledgement or any form of suggestion that this information forms the related art already known to a person skilled in the art.

SUMMARY

The present disclosure has been made in view of the above problems, and it is an object of the present disclosure to provide an exoskeleton-type wearable robot in which rotation joints for external/internal rotation are replaced by a spherical four-bar mechanism, such that the rotation center thereof coincides with the rotation center of the joint of the wearer, and in which rotation joints for flexion/extension are replaced by a four-bar mechanism, thereby supporting the flexion/extension moment and the abduction/adduction moment necessary for walking simultaneously using only one actuator, thus enabling the wearer to walk more naturally.

In accordance with the present disclosure, the above and other objects can be accomplished by the provision of an exoskeleton-type wearable robot including a first fixing unit configured to be worn on the body of the wearer, a first connection unit rotatably connected to the first fixing unit, a second connection unit spaced apart from the first connection unit and connected to the first connection unit via a first link assembly, and a second fixing unit connected to the arm or the leg of the wearer and connected to the second connection unit via a second link assembly. The rotation center of each of the connection points connecting the first link assembly, the second connection unit, and the second link assembly to one another is disposed so as to be oriented toward the center of the joint of the wearer.

The first fixing unit may be connected to the waist of the wearer, the second fixing unit may be connected to the thigh of the wearer, and the center of the joint of the wearer may be the center of the hip joint.

A plurality of links constituting the first connection unit, the second connection unit, the first link assembly, and the second link assembly may be formed in the shape of a curved surface that is a part of an imaginary sphere centered on the center of the joint of the wearer.

The first connection unit may be disposed behind the wearer, and may be rotatably connected at one end thereof to the rear surface of the first fixing unit.

The first link assembly may include a pair of links, and may form a four-bar mechanism together with the first connection unit and the second connection unit.

The second link assembly may include a pair of links, and may form a four-bar mechanism together with the second connection unit and the second fixing unit.

The second connection unit may be connected at one end portion thereof to the first connection unit via the first link assembly, and may be connected at the other end portion thereof to the second fixing unit via the second link assembly.

The first connection unit may be disposed behind the wearer, the second fixing unit may be disposed beside the wearer, and the second connection unit may be disposed between the first connection unit and the second fixing unit.

The instantaneous rotation axis of the first link assembly may be a vertical axis extending vertically from the center of the joint of the wearer, and internal/external rotational motion may be performed about the instantaneous rotation axis of the first link assembly.

The instantaneous rotation axis of the second link assembly may vary depending on abduction or adduction motion and flexion or extension motion.

The instantaneous rotation axis of the second link assembly may be oriented toward the center of the joint of the wearer.

The first fixing unit may be connected to the waist of the wearer, the second fixing unit may be connected to the thigh of the wearer, the center of the joint of the wearer may be the center of the hip joint, and the instantaneous rotation axis of the second link assembly during the stance phase of walking of the wearer may be changed from the direction indicated by the sum of the components of abduction motion and extension motion to the direction indicated by the sum of the components of adduction motion and flexion motion.

The exoskeleton-type wearable robot may further include an actuator provided at the connection point connecting the first fixing unit and the first connection unit, and the actuator may provide rotational force to the first connection unit with respect to the first fixing unit.

The exoskeleton-type wearable robot may further include a rotation angle sensor provided at at least one of the connection points connecting the first fixing unit, the first connection unit, the first link assembly, the second connection unit, the second link assembly, and the second fixing unit to one another.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Hereinafter, an exoskeleton-type wearable robot according to exemplary embodiments of the present disclosure will be described with reference to the accompanying drawings.

Figure 1:
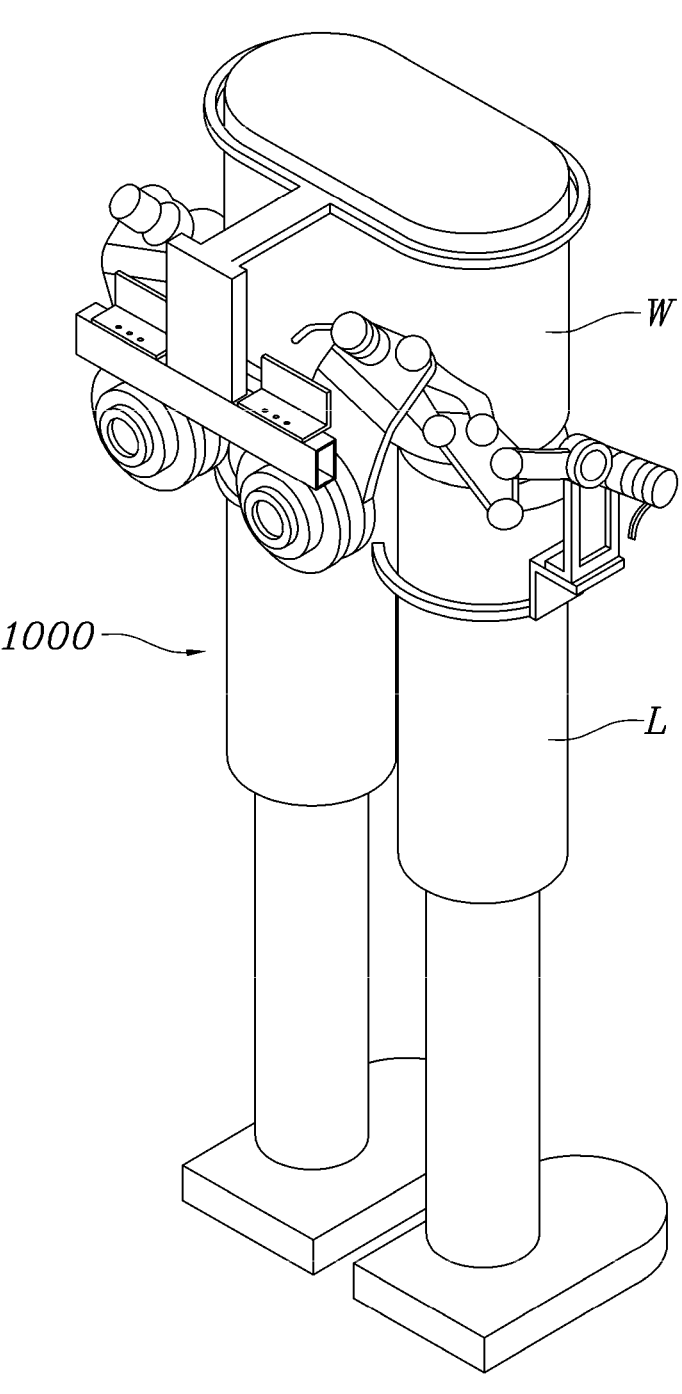
FIG. 1 is a perspective view of an exoskeleton-type wearable robot according to an embodiment of the present disclosure.
Figure 2:
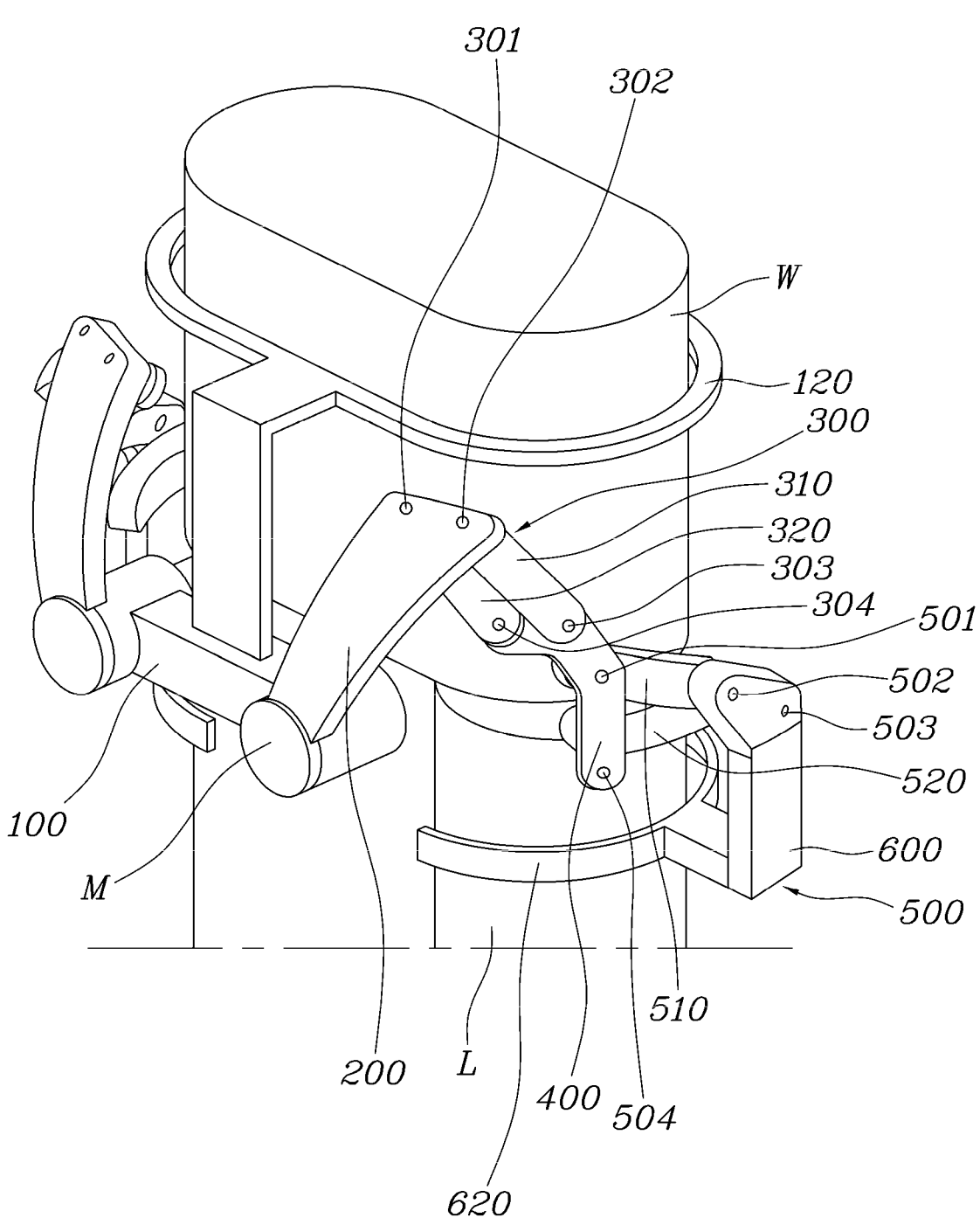
FIG. 2 is an enlarged perspective view of the exoskeleton-type wearable robot according to the embodiment of the present disclosure.
Figure 3:
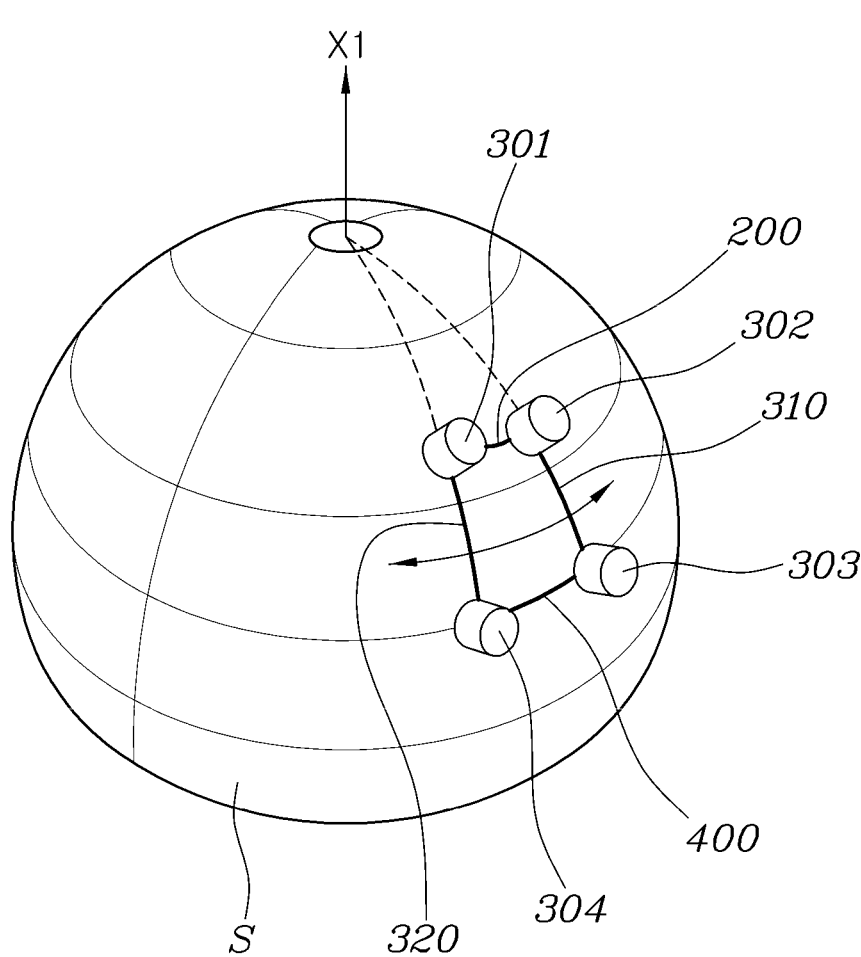
FIGS. 3, 4, and 5 are views for explaining the external/internal rotational motion of the exoskeleton-type wearable robot according to the embodiment of the present disclosure.
Figure 4:
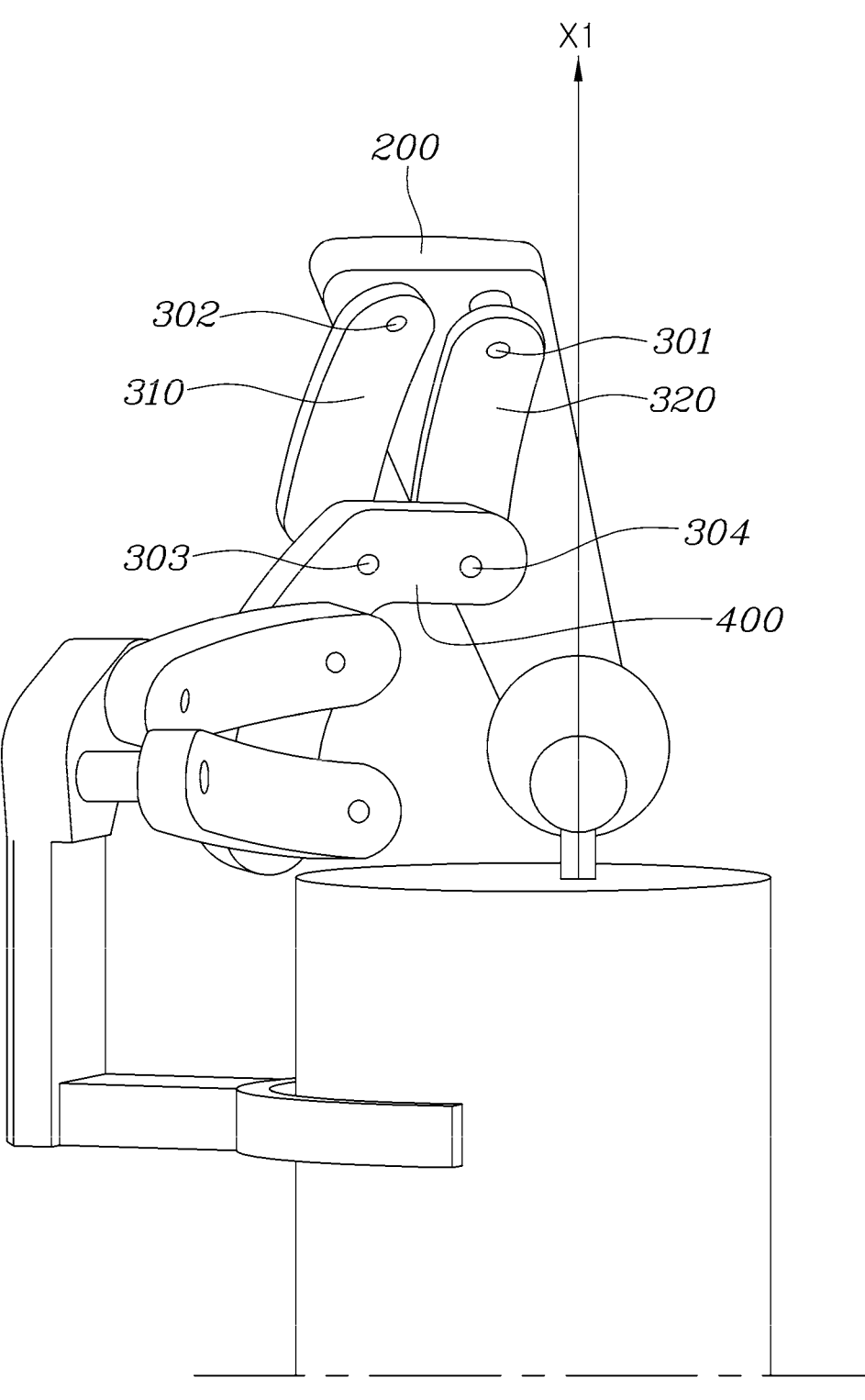
Figure 5:
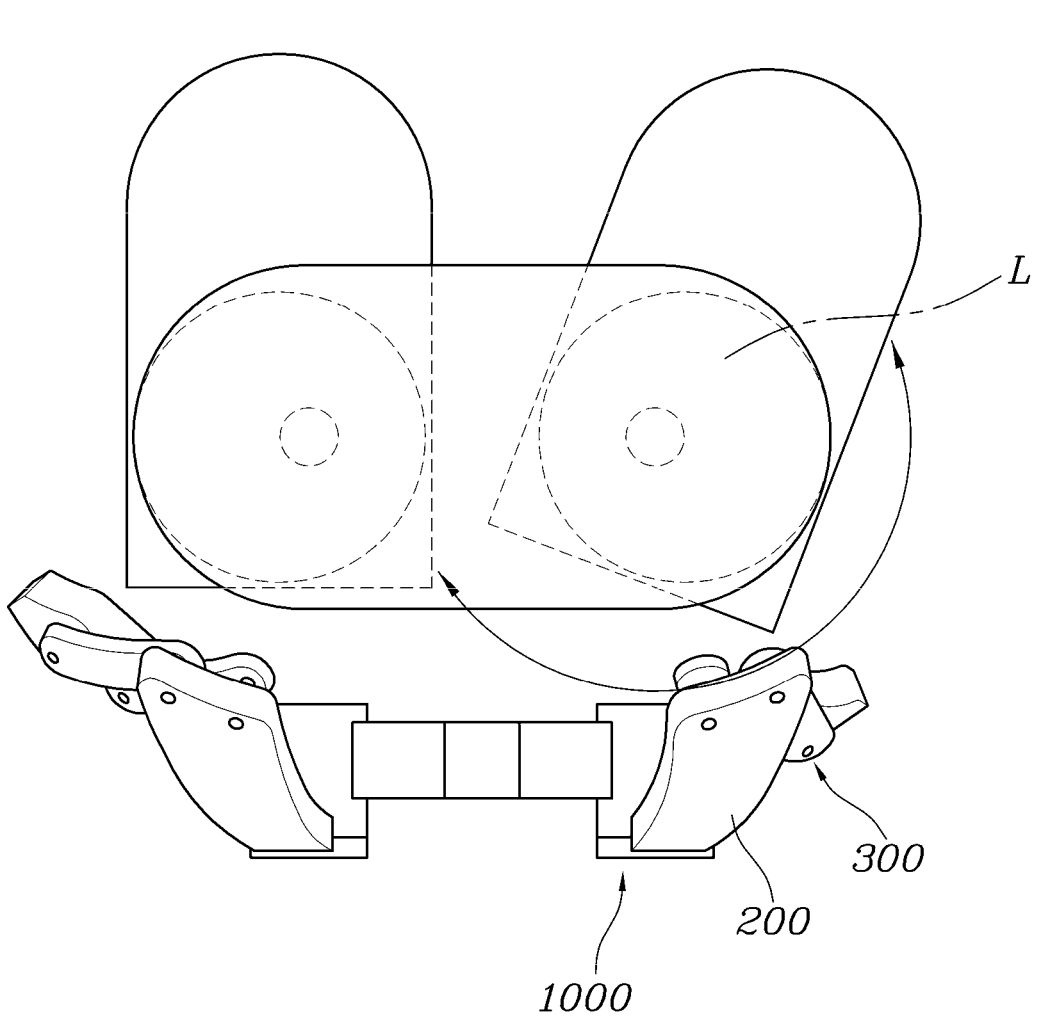
Figure 6:
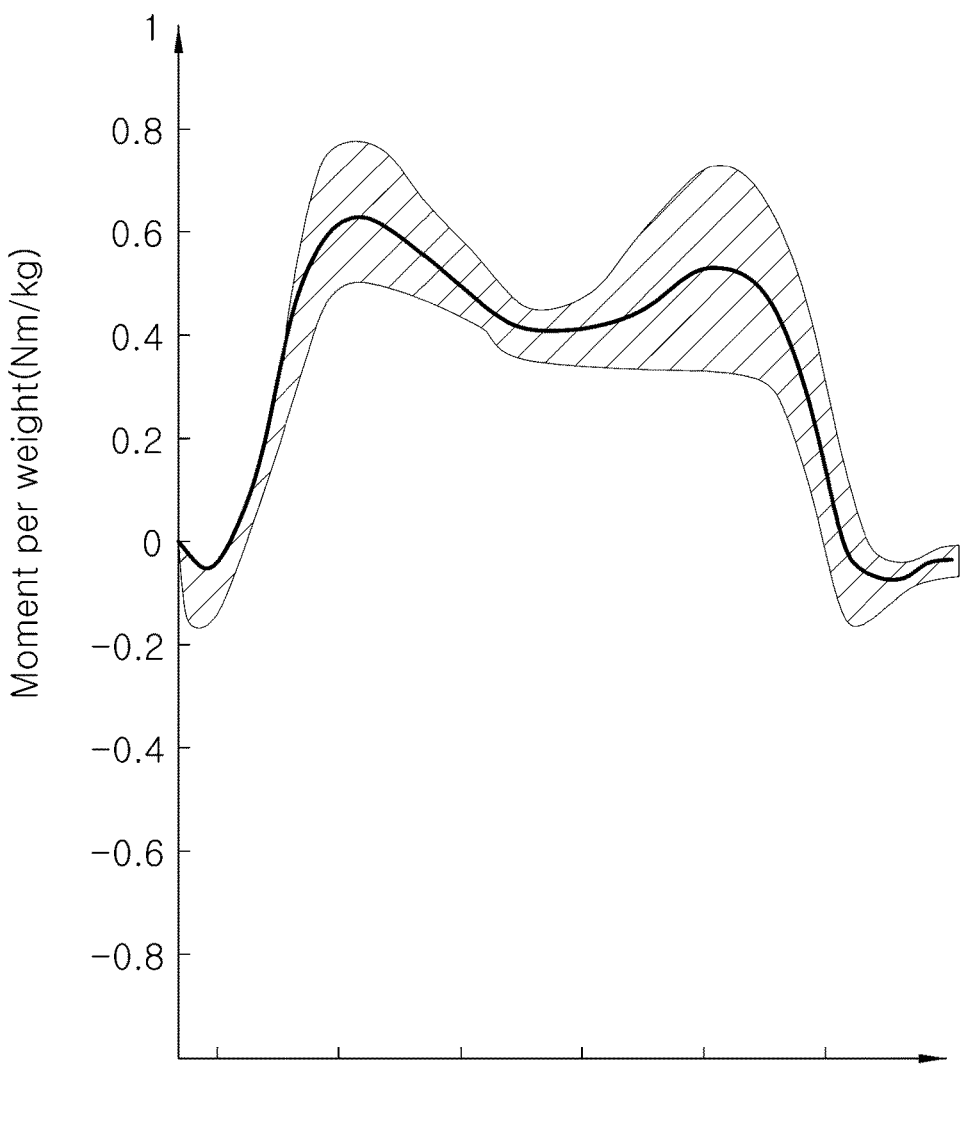
FIGS. 6, 7, and 8 are graphs showing variation in the moment that occurs during a stance phase of walking in the exoskeleton-type wearable robot according to the embodiment of the present disclosure.
Figure 6:
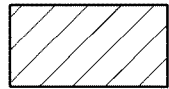
Figure 7:
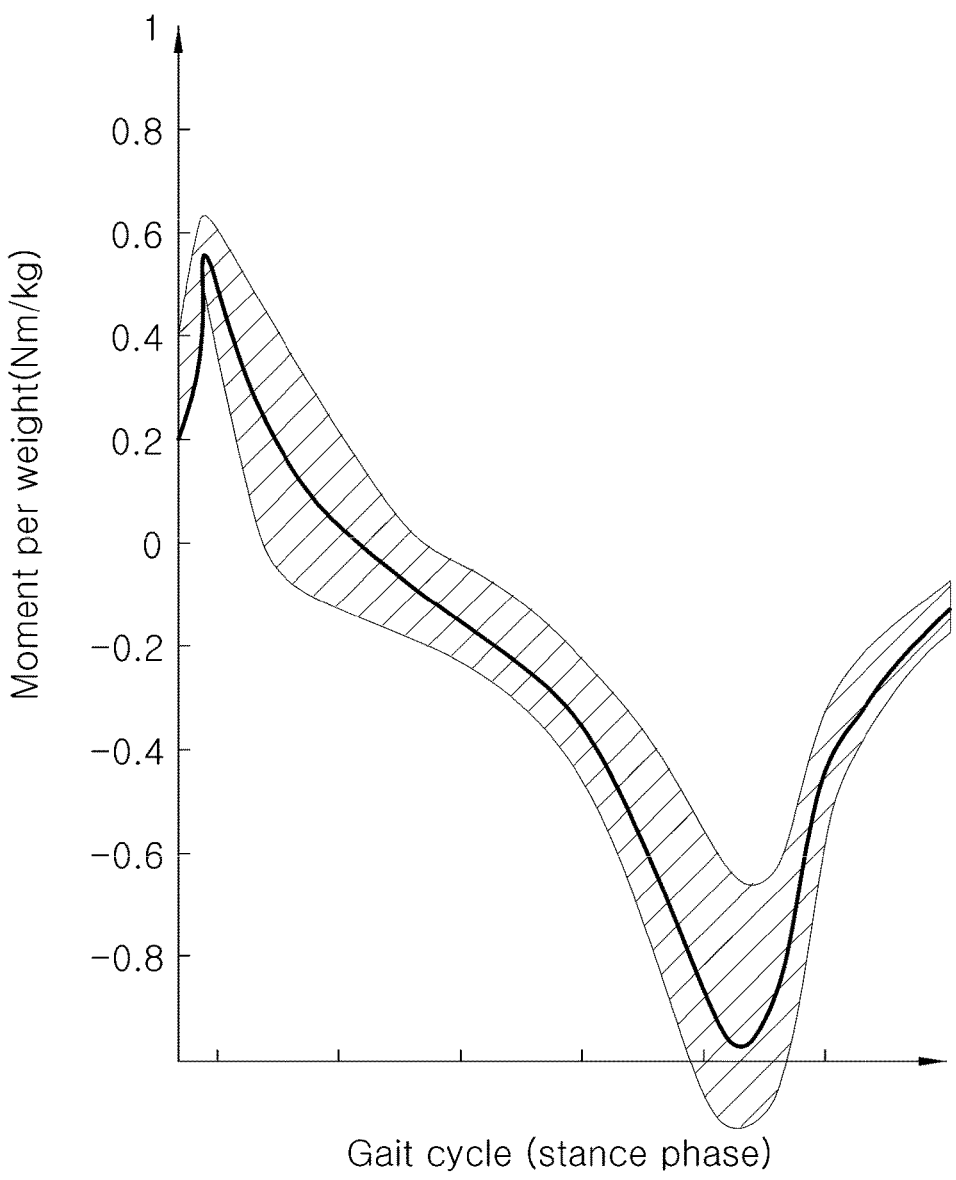
Figure 7:
Figure 8:
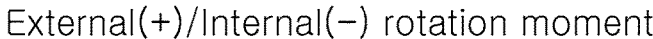
Figure 8:
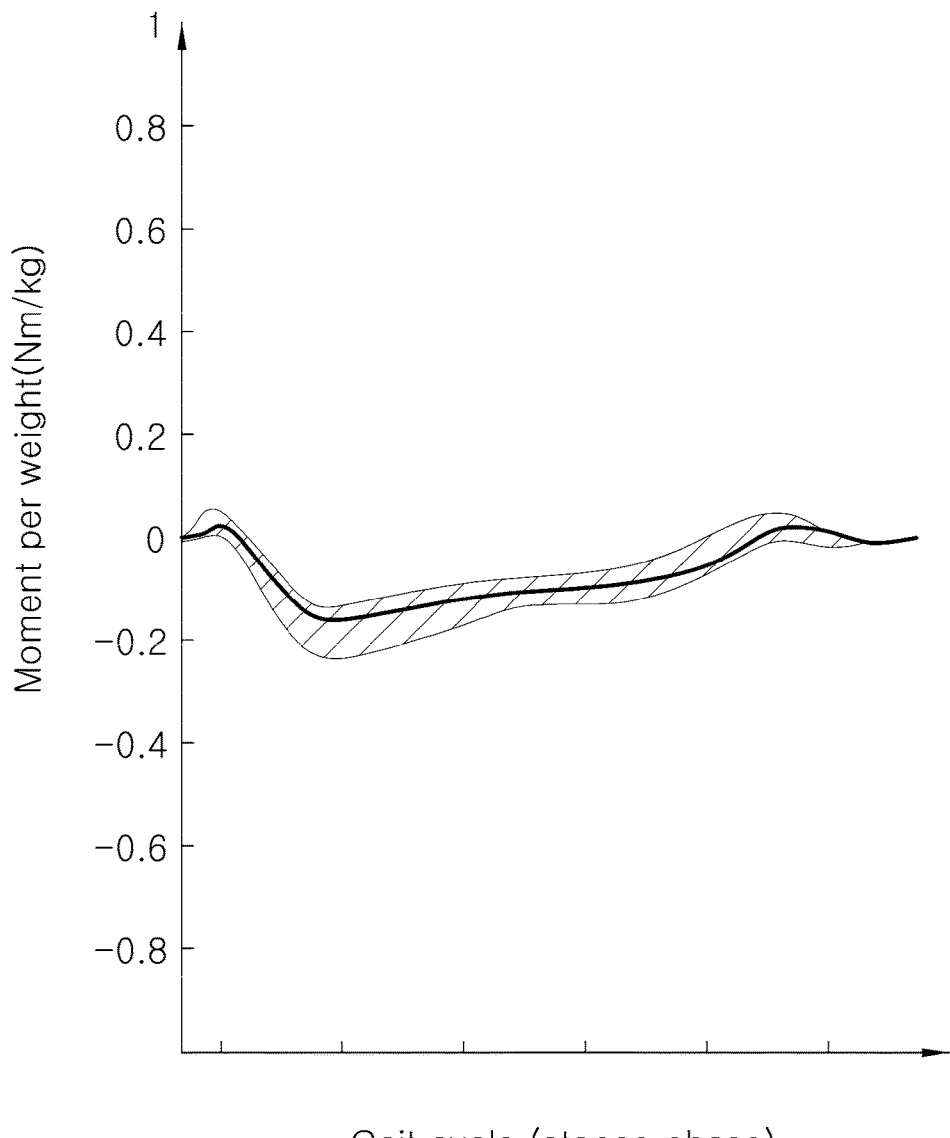
Figure 8:
Figure 9:
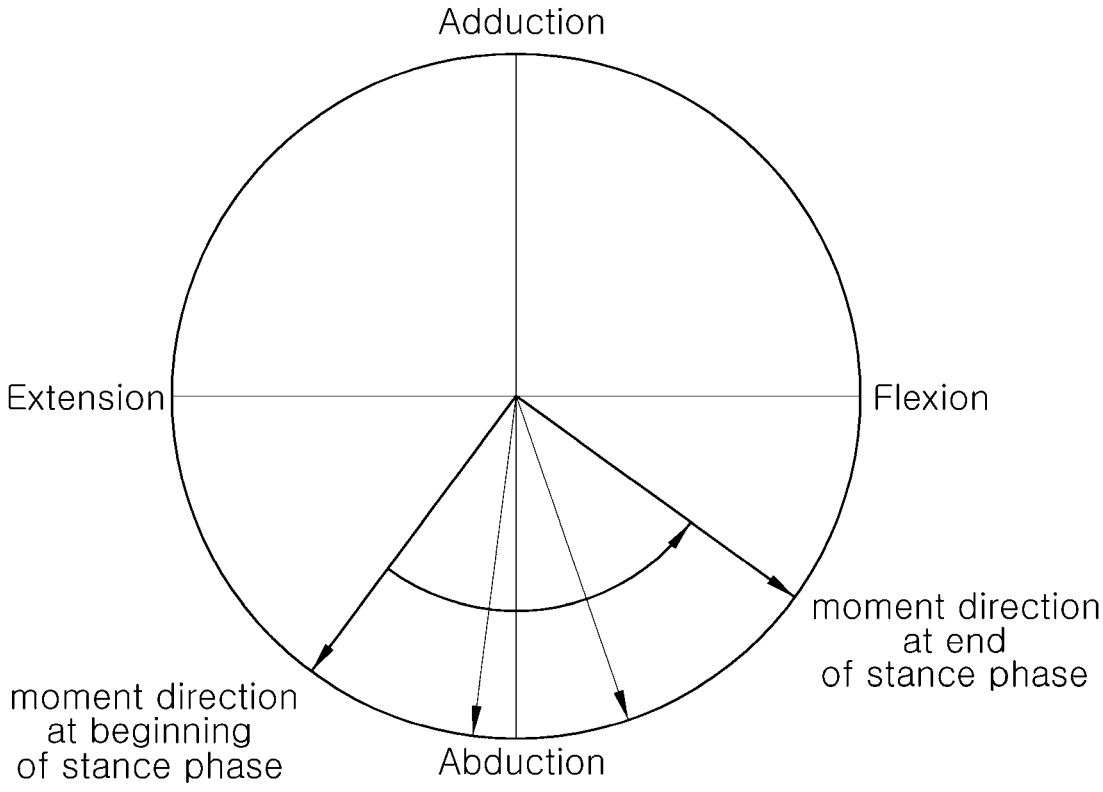
FIG. 9 is a diagram showing variation in the moment that occurs during the stance phase of walking in the exoskeleton-type wearable robot according to the embodiment of the present disclosure.
Figure 16:
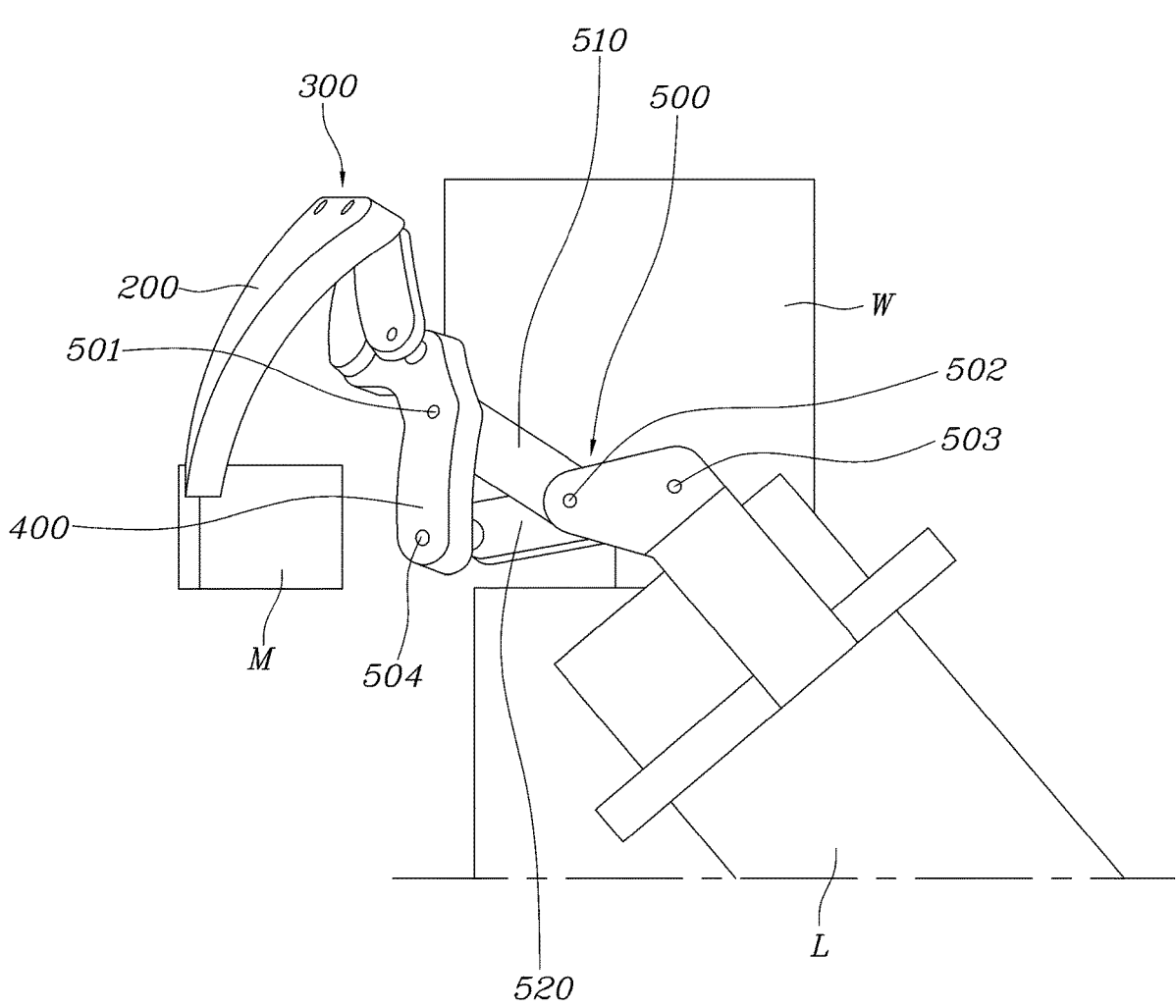
Figure 17:
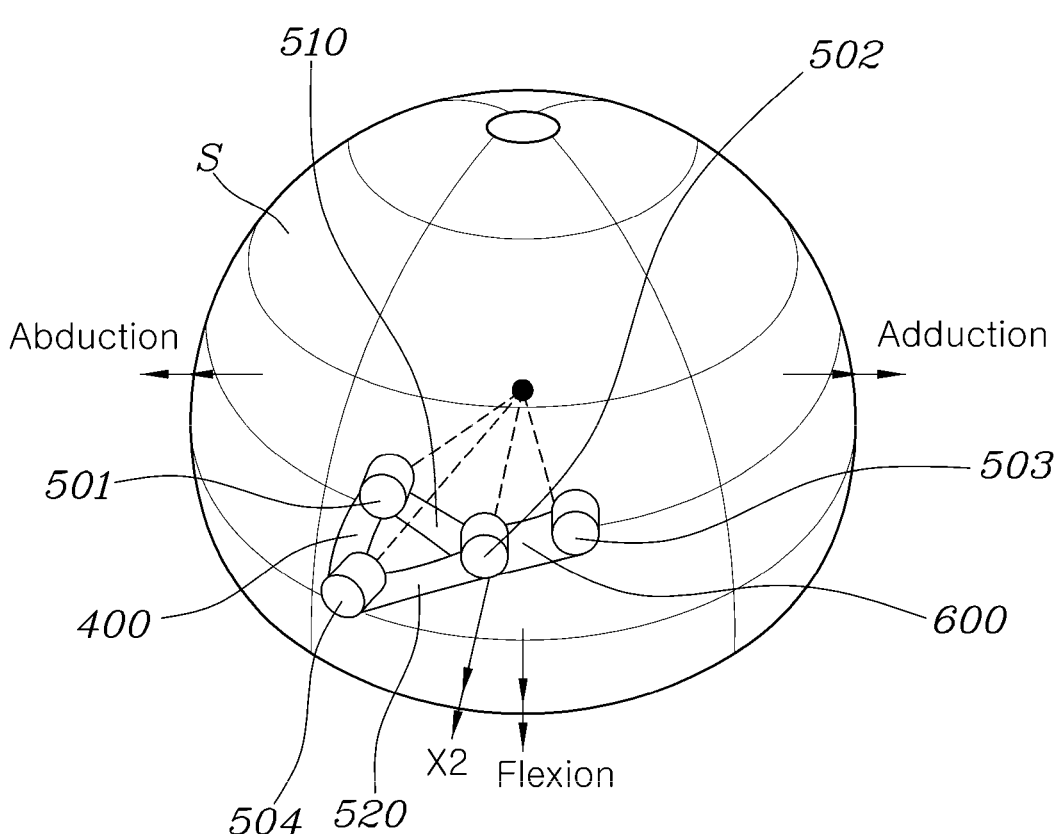
Figure 18:
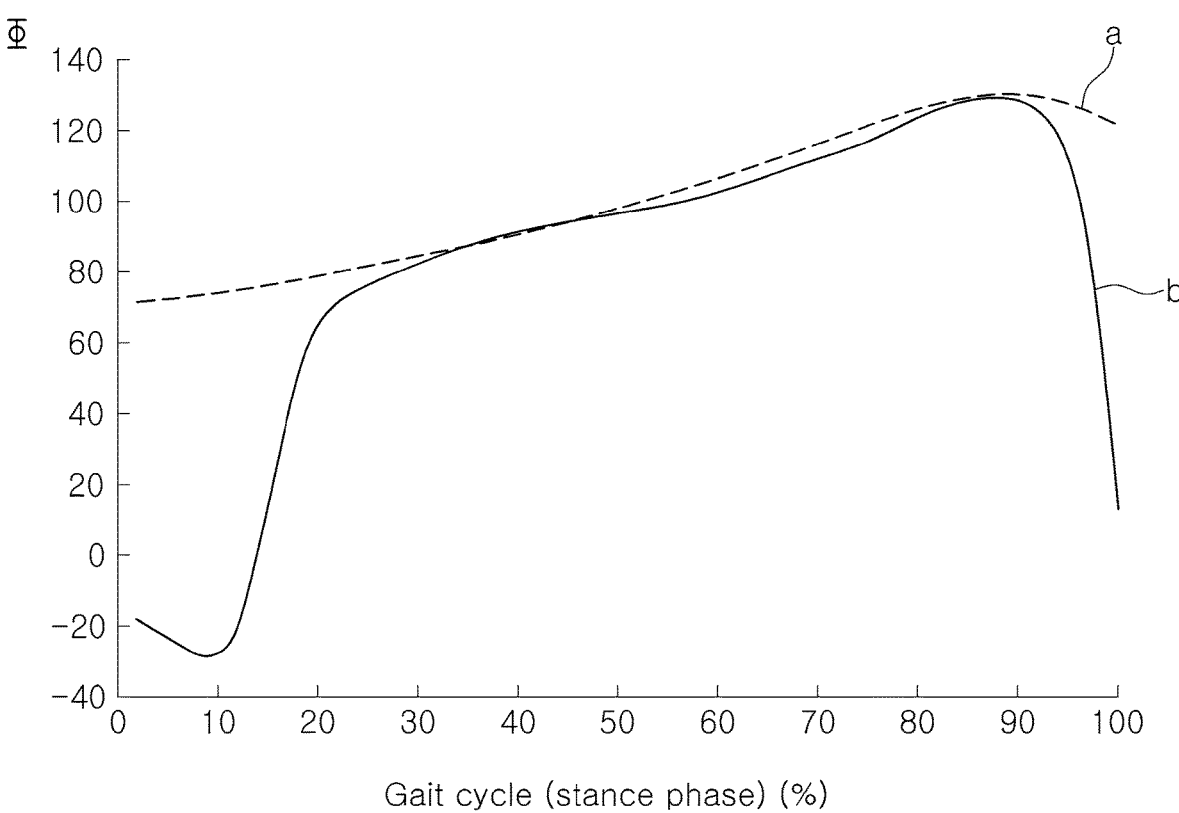
FIGS. 18 and 19 are graphs showing the moment output during the stance phase of walking in the exoskeleton-type wearable robot according to the embodiment of the present disclosure.
Figure 19:
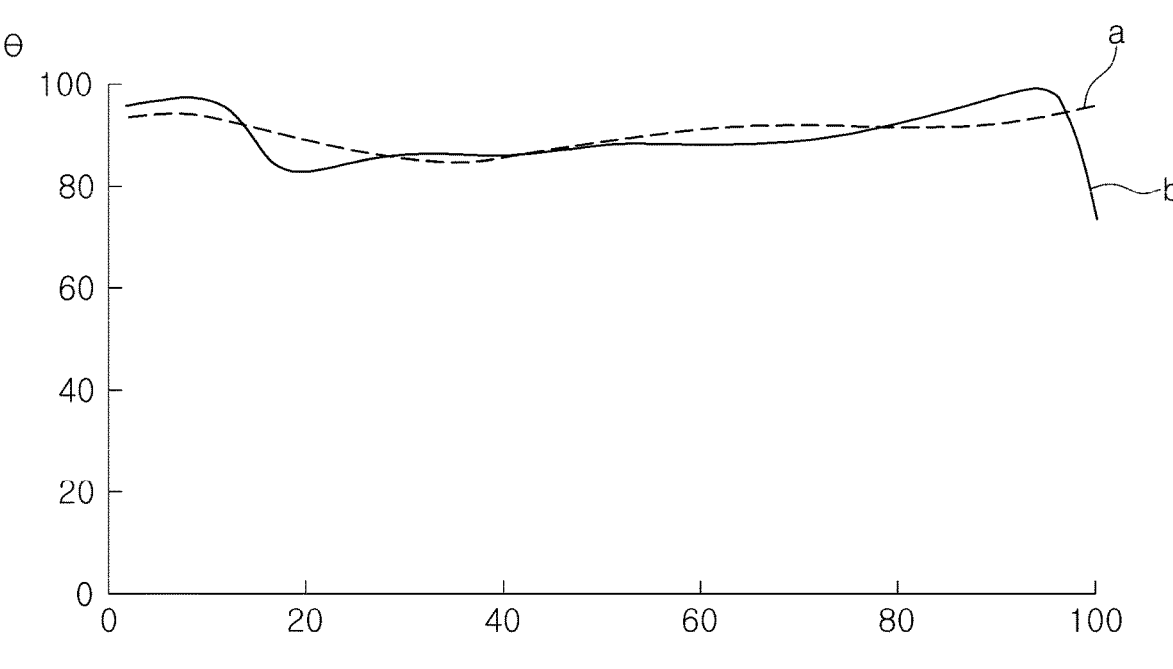
Figure 20:
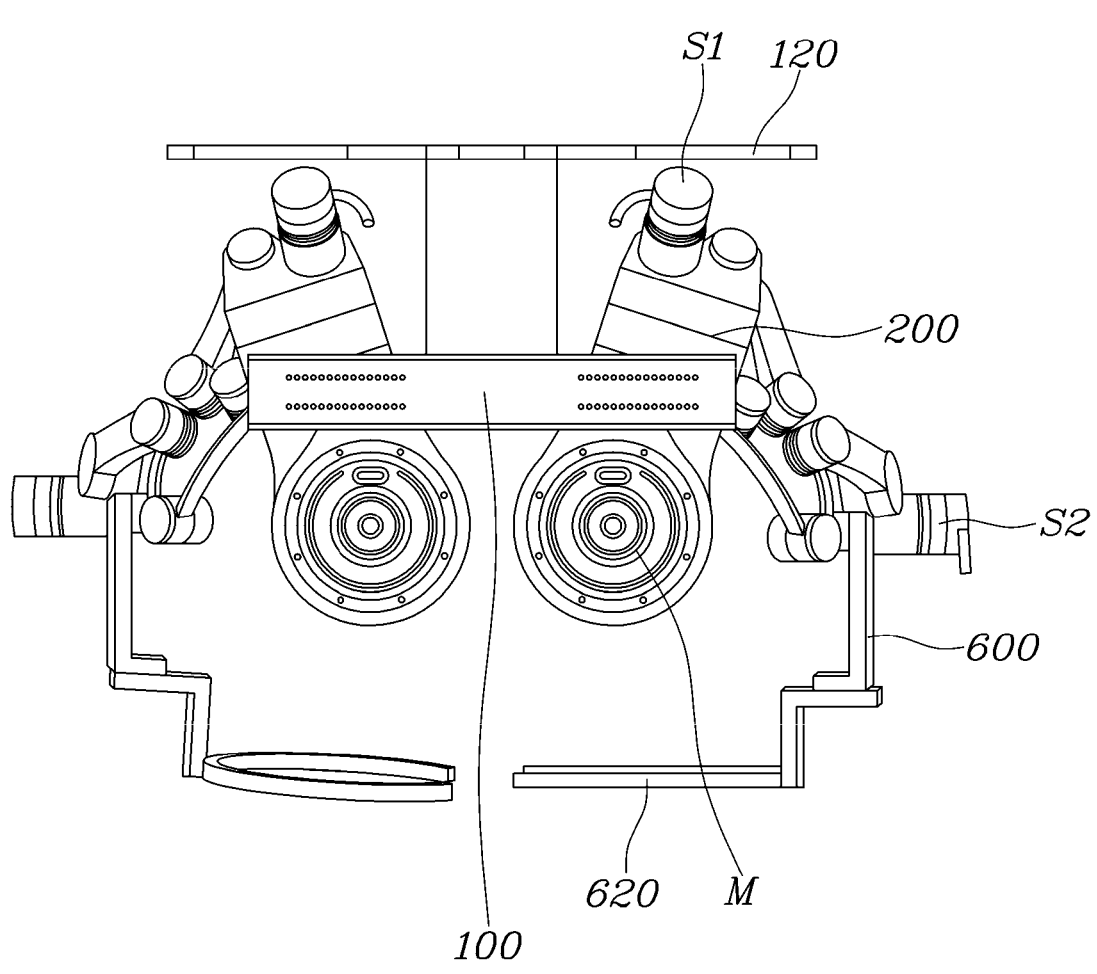
FIGS. 20 and 21 are views showing the size adjustment function of the exoskeleton-type wearable robot according to the embodiment of the present disclosure.
Figure 21:
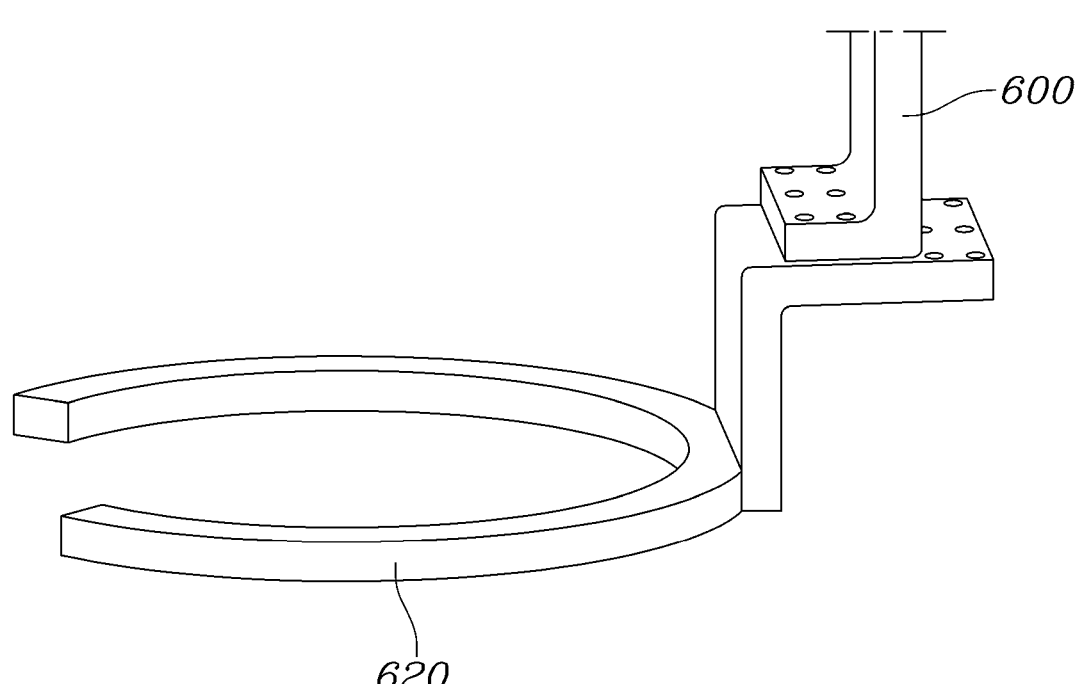

FIG. 1 is a perspective view of an exoskeleton-type wearable robot according to an embodiment of the present disclosure, FIG. 2 is an enlarged perspective view of the exoskeleton-type wearable robot according to the embodiment of the present disclosure, FIGS. 3 to 5 are views for explaining the external/internal rotational motion of the exoskeleton-type wearable robot according to the embodiment of the present disclosure, FIGS. 6 to 8 are graphs showing variation in the moment that occurs during a stance phase of walking in the exoskeleton-type wearable robot according to the embodiment of the present disclosure, FIG. 9 is a diagram showing variation in the moment that occurs during the stance phase of walking in the exoskeleton-type wearable robot according to the embodiment of the present disclosure, FIGS. 10 to 17 are views for explaining a change in an instantaneous rotation axis of a second link assembly during walking in the exoskeleton-type wearable robot according to the embodiment of the present disclosure, FIGS. 18 and 19 are graphs showing the moment output during the stance phase of walking in the exoskeleton-type wearable robot according to the embodiment of the present disclosure, and FIGS. 20 and 21 are views showing the size adjustment function of the exoskeleton-type wearable robot according to the embodiment of the present disclosure.

An exoskeleton-type wearable robot 1000 according to the present disclosure may include a first fixing unit 100, which is worn on the body of a wearer, a first connection unit 200, which is rotatably connected to the first fixing unit 100, a second connection unit 400, which is spaced apart from the first connection unit 200 and is connected to the first connection unit 200 via a first link assembly 300, and a second fixing unit 600, which is connected to the arm or the leg of the wearer and is connected to the second connection unit 400 via a second link assembly 500. The rotation center of each of the connection points at which the first link assembly 300, the second connection unit 400 and the second link assembly 500 are connected may be disposed so as to be oriented toward the center of the joint of the wearer.

The exoskeleton-type wearable robot according to the present disclosure is an apparatus that forms an exoskeleton to support the motion of the wearer. Thus, it is important to locate the rotation center of the exoskeleton robot so as to coincide with the rotation center of the joint of the wearer as closely as possible. When these rotation centers do not coincide with each other, wearing comfort is deteriorated, and it is difficult for the wearer to perform a motion naturally.

The exoskeleton-type wearable robot 1000 of the present disclosure may be worn on various body parts of the wearer, and may work in tandem with the wearer. In particular, as shown in FIGS. 1 and 2, the first fixing unit 100 is connected to the waist W of the wearer via a part 120, and the second fixing unit 600 is connected to the thigh L of the wearer via a part 620. Herein, the center of the joint of the wearer refers to the center of the hip joint. Due to this structure, the exoskeleton-type wearable robot of the present disclosure is capable of supporting the leg L of the wearer when the wearer walks, thereby fundamentally supporting the motion of the hip joint of the wearer.

Specifically, the first fixing unit 100 is connected to the waist W of the wearer. The first fixing unit 100 is tightly fitted on the waist W of the wearer so as to be maintained in place when the wearer walks. The first connection unit 200 is connected to the first fixing unit 100. Specifically, the first connection unit 200 is connected to the first fixing unit 100 via a motor M. The first connection unit 200 supports walking of the wearer in the manner of being rotated by the operation of the motor M.

The first connection unit 200 may be disposed behind the wearer, and may be rotatably connected at one end thereof to the rear surface of the first fixing unit 100. The first connection unit 200 may be two in number, disposed on the left and the right of the first fixing unit 100 so as to independently support the left thigh and the right thigh of the wearer, respectively.

The second connection unit 400 is disposed so as to be spaced apart from the distal end of the first connection unit 200. The second connection unit 400 is connected to the first connection unit 200 via the first link assembly 300. The second connection unit 400 is formed in the shape of a bar that is curved at the center thereof. As illustrated, the second connection unit 400 is connected at one end portion thereof to the first link assembly 300, and is connected at the other end portion thereof to the second link assembly 500. The first link assembly 300 may include a pair of links 310 and 320, and may form a four-bar mechanism together with the first connection unit 200 and the second connection unit 400. The second link assembly 500 may include a pair of links 510 and 520, and may form a four-bar mechanism together with the second connection unit 400 and the second fixing unit 600.

That is, the second connection unit 400 is connected to the first connection unit 200 and the second fixing unit 600 by a four-bar mechanism. The second fixing unit 600 is connected to the arm or the leg of the wearer, and is connected to the second connection unit 400 via the second link assembly 500. The rotation center of each of the connection points at which the first link assembly 300, the second connection unit 400 and the second link assembly 500 are connected is oriented toward the center of the joint of the wearer. Thereby, the rotation center of the robot coincides with the rotation center of the joint of the wearer, so the wearer feels a comfortable wearing sensation when walking in the exoskeleton robot according to the present disclosure.

Specifically, the links, which constitute the first connection unit 200, the second connection unit 400, the first link assembly 300, and the second link assembly 500, may be formed having a curved surface that is a part of an imaginary sphere centered on the center of the joint of the wearer. That is, all of the links and the parts are disposed on the curved surface of the imaginary sphere centered on the center of the joint of the wearer, and have the shape of a curved surface corresponding to the curved surface of the imaginary sphere. Accordingly, the actual rotation center of the robot coincides with the rotation center of the joint of the wearer.

Meanwhile, the second connection unit 400 may be connected at one end portion thereof to the first connection unit 200 via the first link assembly 300, and may be connected at the other end portion thereof to the second fixing unit 600 via the second link assembly 500. The first connection unit 200 may be disposed behind the wearer, the second fixing unit 600 may be disposed beside the wearer, and the second connection unit 400 may be disposed between the first connection unit 200 and the second fixing unit 600.

The instantaneous rotation axis of the first link assembly 300 may be a vertical axis X1 that extends vertically from the center of the joint of the wearer, and the internal/external rotational motion may be performed about the instantaneous rotation axis of the first link assembly 300. FIGS. 3 to 5 are views for explaining the external/internal rotational motion of the exoskeleton-type wearable robot according to the embodiment of the present disclosure.

FIG. 3 is a diagram of the first four-bar mechanism formed by the first connection unit 200, the first link assembly 300, and the second connection unit 400. The first four-bar mechanism may be understood as being disposed in a spherical coordinate, and may be conceptually depicted as shown in FIG. 3. As shown in FIG. 3, the instantaneous movement of the second connection unit (the link 400) relative to the first connection unit (the link 200) may be understood as being rotational movement about the axis connecting the center of the sphere and the intersection point between the curved line passing through the joints 304 and 301 on the surface of the sphere and the curved line passing through the joints 303 and 302 on the surface of the sphere. That is, the first link assembly forms a four-bar mechanism, and the four-bar mechanism is rotated based on the sphere, thereby implementing the external/internal rotational motion of the thigh L of the wearer.

As shown in FIG. 4, the first four-bar mechanism formed by the first connection unit 200, the first link assembly 300, and the second connection unit 400 implements external/internal rotational motion about the vertical axis X1. Accordingly, as shown in FIG. 5, the first link assembly 300 enables internal/external rotational motion of the hip joint of the wearer in the state of being located behind the hip of the wearer, and thus does not interfere with the leg of the wearer during rotation, thereby improving wearing comfort and increasing the range of motion (ROM).

FIGS. 6 to 8 are graphs showing variation in the moment that occurs during a stance phase of walking in the exoskeleton-type wearable robot according to the embodiment of the present disclosure. The gait cycle of a human is composed of a stance phase and a swing phase. During the stance phase, in which the wearer steps on the ground, because the body of the wearer receives ground reaction force (GRF), the moment generated by muscles increases. Therefore, the robot of the present disclosure proposes a structure capable of implementing the direction of the moment of the hip joint necessary for the stance phase. FIGS. 6 to 8 show the moment of the hip joint necessary for the stance phase. Referring to FIG. 6, it can be seen that the abduction moment varies in the form of increase-decrease-increase-decrease during the stance phase. In addition, referring to FIG. 7, it can be seen that an extension moment, a flexion moment, and an extension moment are generated in that order. In addition, it can be seen that the magnitude of the external rotation moment and the magnitude of the internal rotation moment are very small.

Based on this variation in moment, as shown in FIG. 9, it can be seen that the value of the rotation component is very small and that the value of the extension component changes from "+" to "−" while the value of the abduction component is maintained at "+". That is, as shown in FIG. 9, during the stance phase, the direction of the axis of the hip joint moment is schematically changed within the plane containing the extension/flexion axis and the adduction/abduction axis, and is moved from the middle between the abduction direction and the extension direction to the middle between the abduction direction and the flexion direction.

FIGS. 10 to 17 are views for explaining a change in the instantaneous rotation axis of the second link assembly during walking in the exoskeleton-type wearable robot according to the embodiment of the present disclosure.

Figure 10:
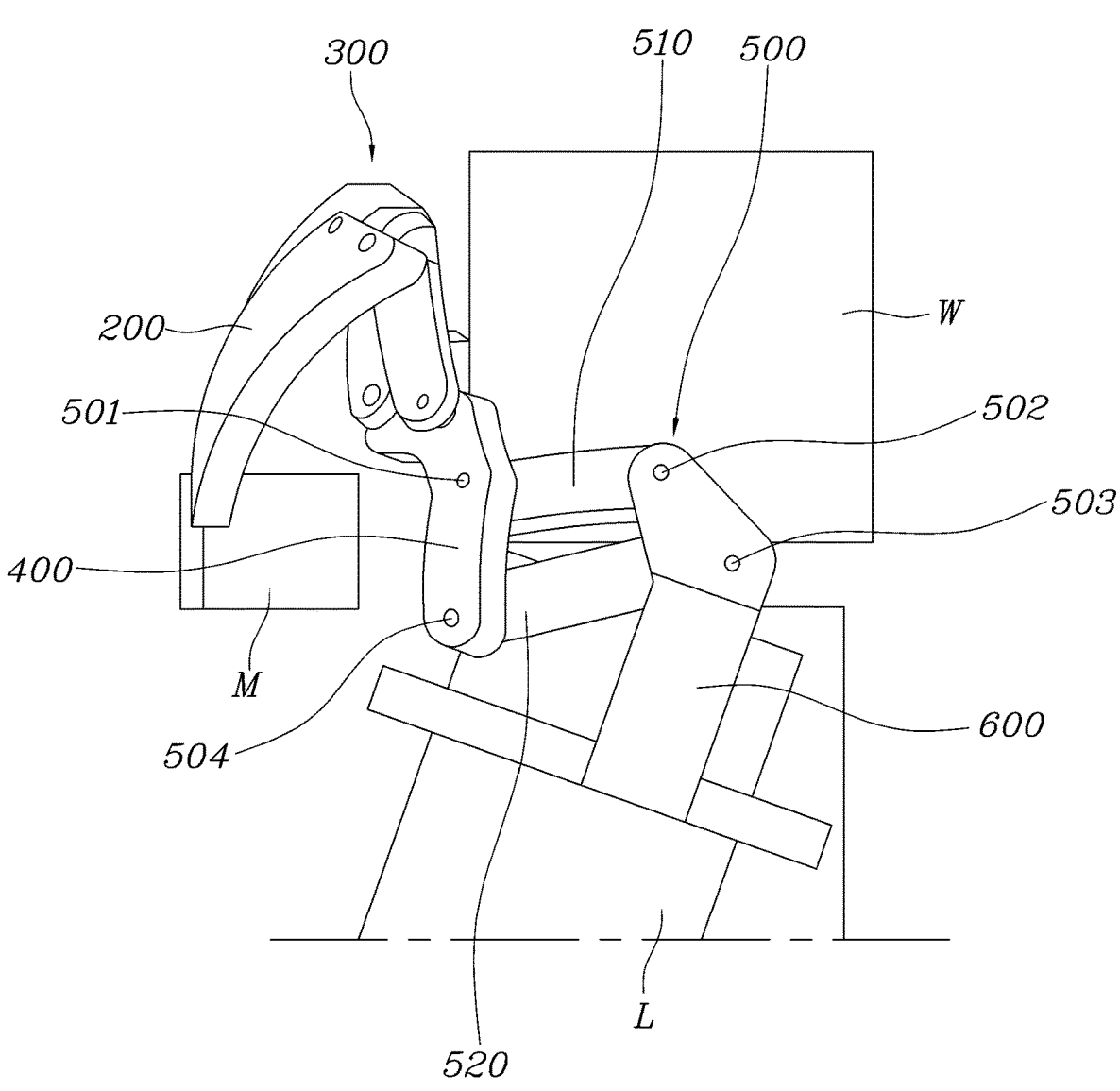
FIGS. 10, 11, 12, 13, 14, 15, 16, and 17 are views for explaining a change in an instantaneous rotation axis of a second link assembly during walking in the exoskeleton-type wearable robot according to the embodiment of the present disclosure.
Figure 11:
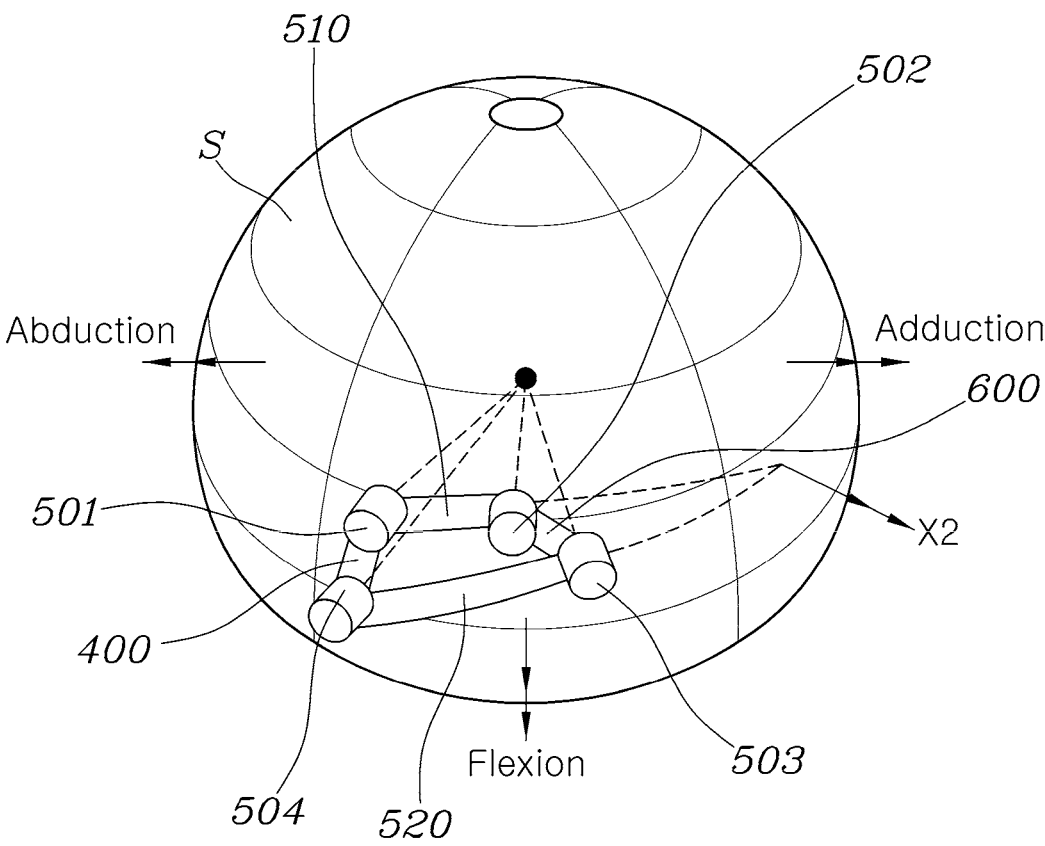
Figure 12:
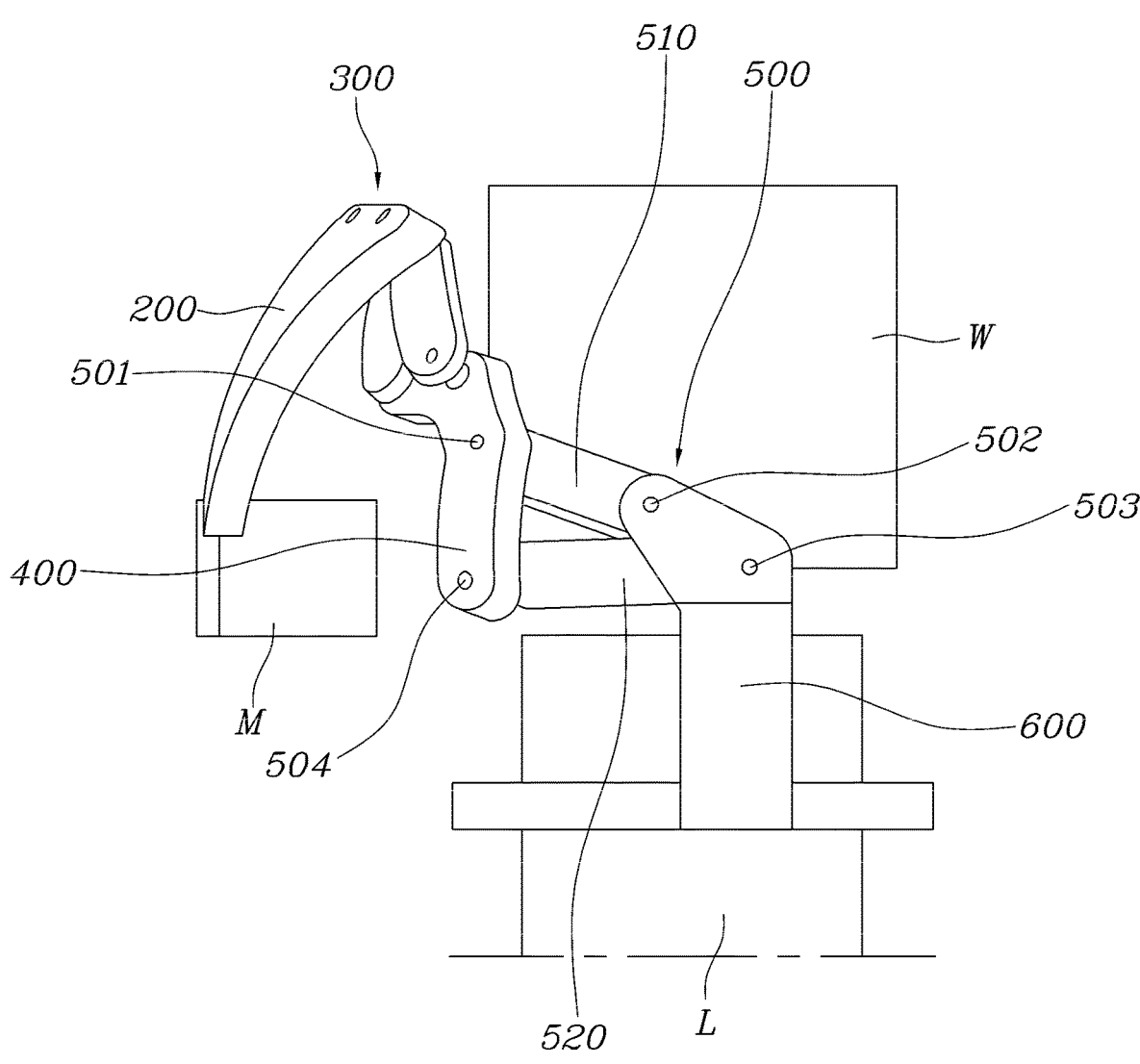
Figure 13:
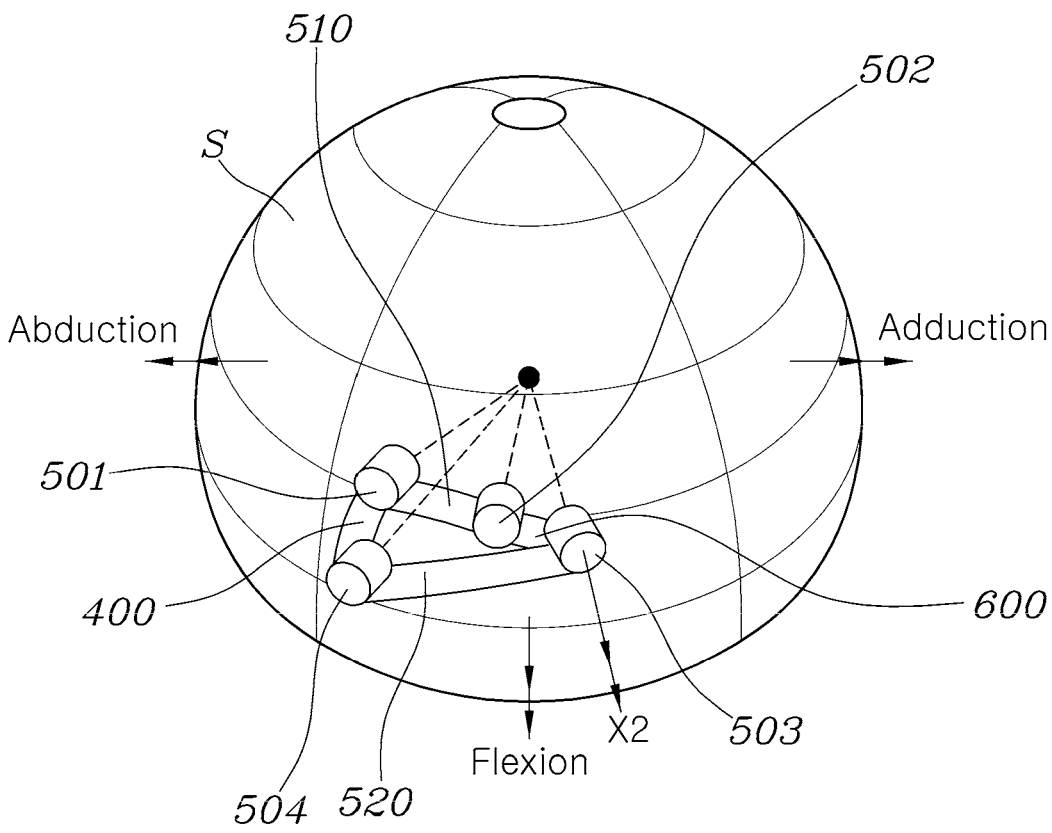
Figure 14:
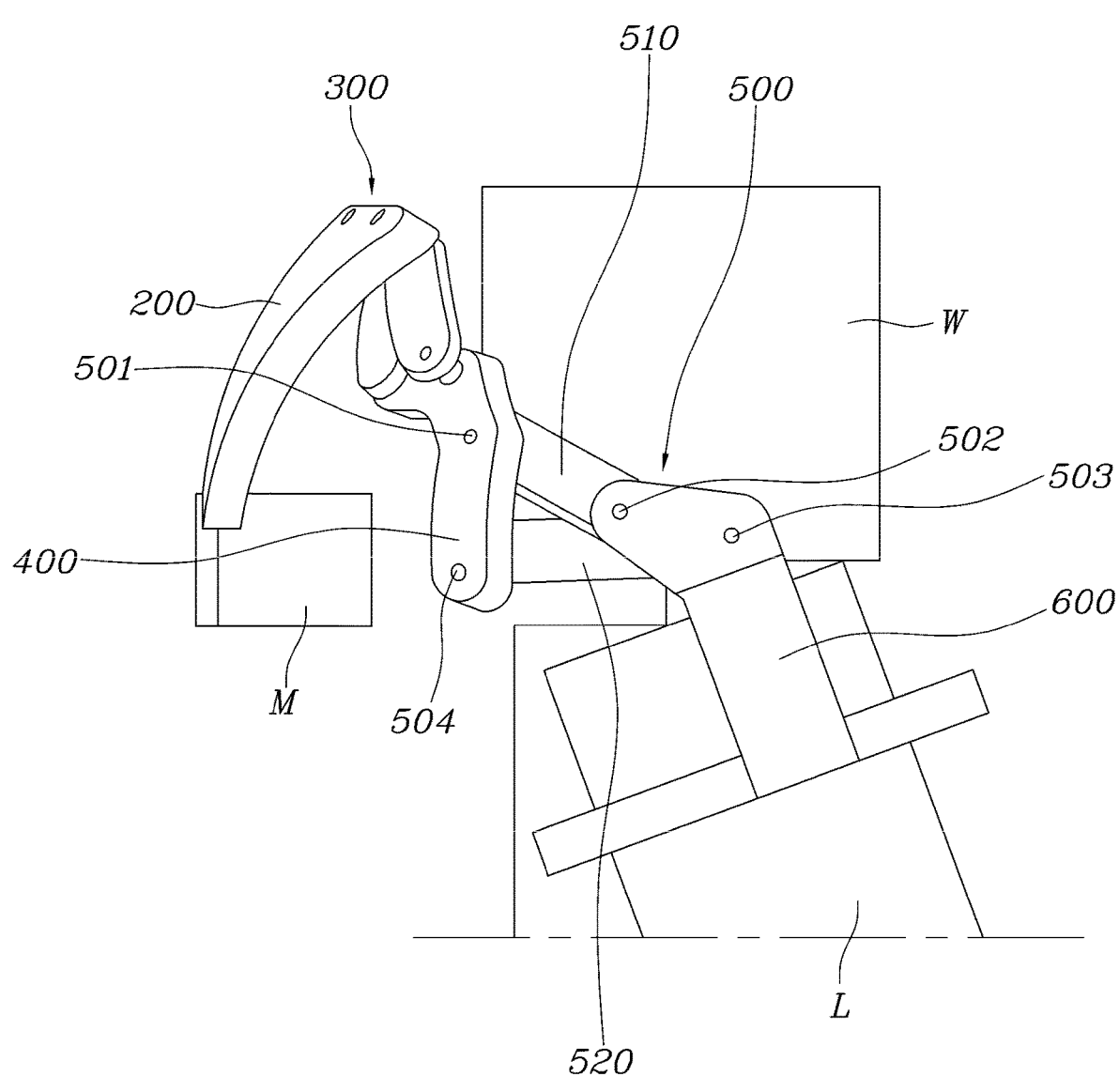
Figure 15:
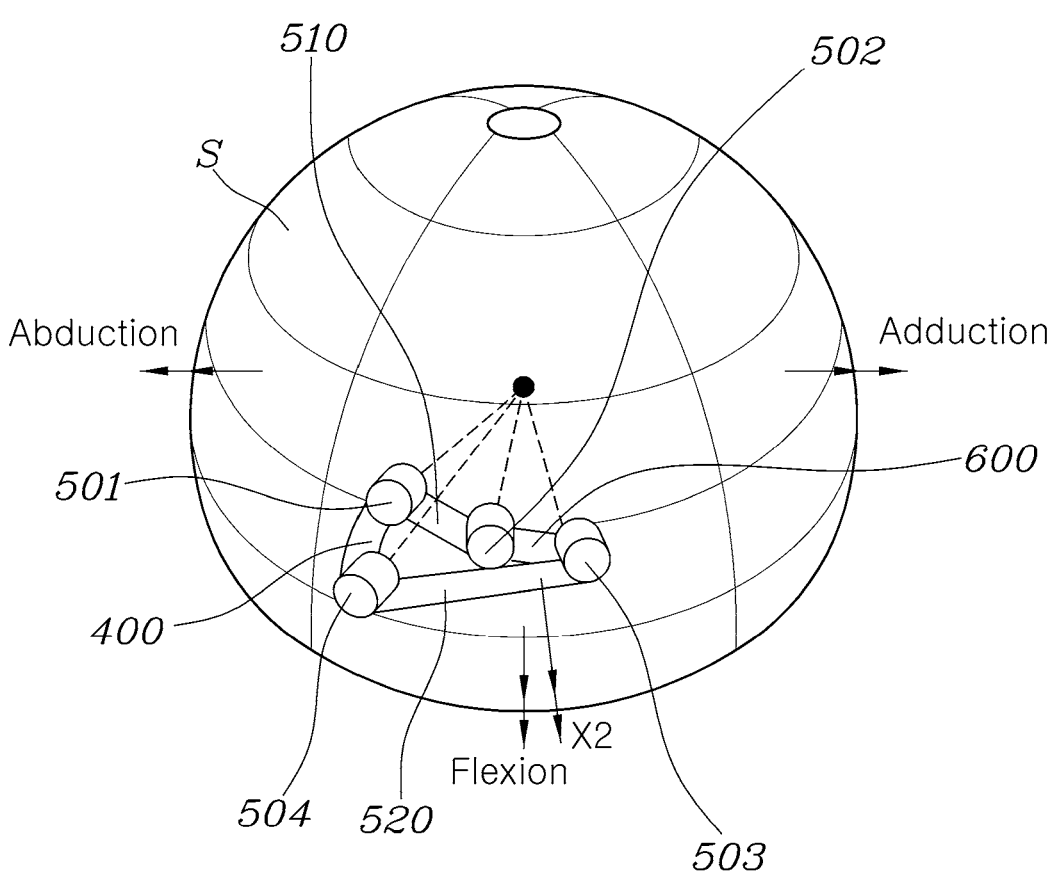

FIGS. 10 and 11 show extension motion performed 20 degrees backwards, FIGS. 12 and 13 show a neutral state, FIGS. 14 and 15 show flexion motion performed 20 degrees forwards, and FIGS. 16 and 17 show flexion motion performed 40 degrees forwards.

The link of the second fixing unit 600 and the link of the second connection unit 400 are connected via the spherical 4-bar mechanism (joints 501, 502, 503 and 504), having one degree of freedom. As shown in FIGS. 10 and 11, the instantaneous movement of the second fixing unit 600 relative to the second connection unit 400 may be understood as being rotational movement about an axis X2 connecting the center of the sphere and the intersection point between the curved line passing through the joints 501 and 502 on the surface of the sphere and the curved line passing through the joints 504 and 503 on the surface of the sphere. Accordingly, as shown in FIGS. 10 to 17, when the wearer performs motion from extension to flexion, the instantaneous rotation axis of the second fixing unit 600 relative to the second connection unit 400 is moved from the middle between the adduction axis and the flexion axis toward the flexion axis, and is then moved to the middle between the flexion axis and the abduction axis.

FIGS. 18 and 19 are graphs showing the moment output during the stance phase of walking in the exoskeleton-type wearable robot according to the embodiment of the present disclosure. Specifically, the graphs in FIGS. 18 and 19 show comparison between the direction of moment necessary for the stance phase of walking and the direction of the output moment to be applied to the wearer during the stance phase of walking by the hip joint mechanism. FIG. 18 shows an angle φ between the moment direction and the Z-axis direction in the spherical coordinate, and FIG. 19 shows an angle θ between the moment direction and the Z-axis direction in the XY plane. In the graphs, "a" represents the output moment of the robot, and "b" represents the moment necessary for the stance phase of walking by the wearer. It can be seen that the angle of the output moment and the angle of the necessary moment substantially coincide with each other in the main middle section, in which the magnitude of the moment is large. In particular, the angle φ is related to the ratio between the abduction-directional moment and the flexion-directional moment, among the moment components. It can be seen that the angle of the output moment and the angle of the necessary moment substantially coincide with each other in the main section (20% to 90% of the stance phase). That is, due to the hip joint mechanism set forth herein, it is possible to implement a three-dimensional moment in the direction necessary for walking using only one actuator.

Accordingly, an actuator M may be provided at the connection point connecting the first fixing unit 100 and the first connection unit 200. The actuator M may provide rotational force to the first connection unit 200 with respect to the first fixing unit 100. For example, the actuator M may be a motor. It is possible to implement both abduction/adduction motion and flexion/extension motion using only one motor M, thereby providing supporting force to the wearer such that the wearer walks naturally. In addition, rotation angle sensors S1 and S2 for measuring the rotation angles of the links may be provided at the respective four-bar mechanisms in order to perform dynamic analysis and inverse kinematic analysis of the respective four-bar mechanisms. Therefore, the rotation angle sensors S1 and S2 may be provided at at least one of the connection points that connect the first fixing unit 100, the first connection unit 200, the first link assembly 300, the second connection unit 400, the second link assembly 500, and the second fixing unit 600 to one another.

FIGS. 20 and 21 are views showing the size adjustment function of the exoskeleton-type wearable robot according to the embodiment of the present disclosure. As shown, a pair of first connection units 200 is disposed on the left and the right of the first fixing unit 100 and is connected thereto, and the distance between the first connection units 200 is adjusted by sliding movement of the first connection units 200. Accordingly, the positions of each first connection unit 200 and the motor M mounted thereto are capable of being adjusted in the lateral direction so that the robot of the present disclosure fits the body of the wearer. The second fixing unit 600 is connected to the thigh L of the wearer via a part 620. The second fixing unit 600 is also configured such that the distance from the part 620 that is directly connected to the thigh L of the wearer is adjusted.

As is apparent from the above description, according to an exoskeleton-type wearable robot of the present disclosure, rotation joints for external/internal rotation are replaced by a spherical four-bar mechanism such that the rotation center thereof coincides with the rotation center of the joint of the wearer and in which rotation joints for flexion/extension are replaced by a four-bar mechanism, thereby supporting the flexion/extension moment and the abduction/adduction moment necessary for walking simultaneously using only one actuator, thus enabling the wearer to walk more naturally.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. An exoskeleton wearable robot, comprising:
a first fixing unit configured to be worn on a body of a wearer;
a first connection unit rotatably connected to the first fixing unit;
a second connection unit spaced apart from the first connection unit and connected to the first connection unit via a first link assembly;
a second fixing unit configured to be connected to an arm or a leg of the wearer, and connected to the second connection unit via a second link assembly; and
an actuator provided at a connection point connecting the first fixing unit and the first connection unit, wherein the actuator provides rotational force to the first connection unit with respect to the first fixing unit;
wherein a rotation center of each of a plurality of connection points connecting the first link assembly, the second connection unit, and the second link assembly together is oriented toward a center of a joint of the wearer;
wherein the first link assembly comprises a pair of links, and forms a four-bar mechanism together with the first connection unit and the second connection unit;
wherein the pair of links of the first link assembly are each connected to different points on the first connection unit and on the second connection unit;
wherein the second link assembly comprises a pair of links, and forms a four-bar mechanism together with the second connection unit and the second fixing unit;
wherein the pair of links of the second link assembly are each connected to different points on the second fixing unit and on the second connection unit;
wherein each of the first connection unit, the second connection unit, the first link assembly, and the second link assembly has a curved surface that is a part of an imaginary sphere centered on the center of the joint of the wearer;
wherein an instantaneous rotation axis of the first link assembly is a vertical axis extending vertically from the center of the joint of the wearer;
wherein internal or external rotational motion is performed about the instantaneous rotation axis of the first link assembly; and
wherein the pair of links of the first link assembly are connected to a first side of the second connection unit at different points, a second side of the second connection unit is bent and extended downward from the first side of the second connection unit, and the pair of links of the second link assembly are connected to the second side of the second connection unit at different points.

2. The exoskeleton wearable robot of claim 1, wherein the first fixing unit is configured to be connected to a waist of the wearer, wherein the second fixing unit is configured to be connected to a thigh of the wearer, and wherein the center of the joint of the wearer is a center of a hip joint of the wearer.

3. The exoskeleton wearable robot of claim 1, wherein the first connection unit is disposed behind the wearer, and is rotatably connected at one end to a rear surface of the first fixing unit.

4. The exoskeleton wearable robot of claim 1, wherein the second connection unit is connected at one end portion to the first connection unit via the first link assembly, and is connected at another end portion to the second fixing unit via the second link assembly.

5. The exoskeleton wearable robot of claim 1, wherein the first connection unit is disposed behind the wearer, wherein the second fixing unit is disposed beside the wearer, and wherein the second connection unit is disposed between the first connection unit and the second fixing unit.

6. The exoskeleton wearable robot of claim 1, wherein the instantaneous rotation axis of the second link assembly varies depending on abduction or adduction motion and flexion or extension motion.

7. The exoskeleton wearable robot of claim 6, wherein the instantaneous rotation axis of the second link assembly is oriented toward the center of the joint of the wearer.

8. The exoskeleton wearable robot of claim 7, wherein the first fixing unit is configured to be connected to a waist of the wearer, wherein the second fixing unit is configured to be connected to a thigh of the wearer, wherein the center of the joint of the wearer is a center of a hip joint of a wearer, and wherein the instantaneous rotation axis of the second link assembly during a stance phase of walking of the wearer is changed from a direction indicated by a sum of components of abduction motion and extension motion to a direction indicated by a sum of components of adduction motion and flexion motion.

9. The exoskeleton wearable robot of claim 1, further comprising:

a rotation angle sensor provided at at least one of connection points connecting the first fixing unit, the first connection unit, the first link assembly, the second connection unit, the second link assembly, and the second fixing unit together.

\* \* \* \* \*